(12) United States Patent
Bleicher (10) Patent No.: US 11,992,910 B2
(45) Date of Patent: May 28, 2024

(54) SENSOR MODULE, MACHINE ELEMENT OR TOOL ELEMENT, AND MACHINE TOOL

(71) Applicant: Friedrich Bleicher, Vienna (AT)

(72) Inventor: Friedrich Bleicher, Vienna (AT)

( * ) Notice: Subject to any disclaimer, the term of this patent is extended or adjusted under 35 U.S.C. 154(b) by 953 days.

(21) Appl. No.: 16/956,758

(22) PCT Filed: Dec. 21, 2018

(86) PCT No.: PCT/EP2018/086692
§ 371 (c)(1),
(2) Date: Jun. 22, 2020

(87) PCT Pub. No.: WO2019/122375
PCT Pub. Date: Jun. 27, 2019

(65) Prior Publication Data
US 2021/0114156 A1    Apr. 22, 2021

(30) Foreign Application Priority Data

Dec. 22, 2017  (DE) ............... 10 2017 131 261.7
Apr. 24, 2018  (DE) ............... 10 2018 109 880.4
May 23, 2018   (DE) ............... 10 2018 112 390.6
Sep. 18, 2018  (DE) ............... 10 2018 122 845.7
Oct. 17, 2018  (DE) ............... 10 2018 125 804.6

(51) Int. Cl.
*B23Q 17/09* (2006.01)
*B23Q 11/12* (2006.01)

(52) U.S. Cl.
CPC ........ *B23Q 17/0952* (2013.01); *B23Q 11/127* (2013.01); *B23B 2260/128* (2013.01)

(58) Field of Classification Search
CPC .............. B23Q 17/0952; B23Q 11/127; B23B 2260/128
See application file for complete search history.

(56) References Cited

U.S. PATENT DOCUMENTS

| 2009/0072502 | A1 | 3/2009 | Weller et al. |
| 2018/0311779 | A1* | 11/2018 | Ziegltrum .......... B23Q 11/1023 |
| 2020/0276673 | A1* | 9/2020 | Stürmer .................... G02B 7/14 |

FOREIGN PATENT DOCUMENTS

| DE | 10029953 A1 | 1/2002 | |
| DE | 102006030834 A1 | 1/2008 | |
| DE | 102008015005 A1 | 9/2009 | |
| DE | 102015220533 A1 | 4/2017 | |
| EP | 1112810 A1 * | 7/2001 | ............. B23Q 17/00 |
| EP | 1112810 A1 | 7/2001 | |

(Continued)

OTHER PUBLICATIONS

Communication issued by the European Patent Office in correlated European Application No. 18833431.2 dated Feb. 10, 2023.

(Continued)

*Primary Examiner* — Manuel L Barbee
(74) *Attorney, Agent, or Firm* — Mindful IP PLLC; Michael J. McCandlish (57) ABSTRACT

The invention relates to: sensor modules for e.g. a tool holder, wherein the sensor unit is integrated as a structural entity; tool or machine elements designed with such sensor modules; and a machining/machine tool comprising such a sensor module. The sensor modules have a sensor system for detecting system states or operating states which occur during the machining of a workpiece.

20 Claims, 10 Drawing Sheets

(56) References Cited

FOREIGN PATENT DOCUMENTS

| | | |
|---|---|---|
| EP | 3184237 A1 | 6/2017 |
| WO | 2007104438 A1 | 9/2007 |
| WO | 2017068158 A1 | 4/2017 |

OTHER PUBLICATIONS

International Search Report and Written Opinion for PCT/EP2018/086692 dated Apr. 8, 2019 (11 pages; with English translation).
German Patent and Trademark Office Search Report for Application No. DE 10 2018 109 880.4 dated Nov. 22, 2018 (English translation only).

* cited by examiner

SENSOR MODULE, MACHINE ELEMENT OR TOOL ELEMENT, AND MACHINE TOOL

CROSS-REFERENCE TO RELATED APPLICATIONS

This application is a national stage of, and claims priority to, Patent Cooperation Treaty Application No. PCT/EP2018/086692, filed on Dec. 21, 2018, which application claims priority to German Application No. DE 10 2017 131 261.7, filed on Dec. 22, 2017, German Application No. DE 10 2018 109 880.4, filed on Apr. 24, 2018, German Application No. DE 10 2018 112 3906, filed on May 23, 2018, German Application No. DE 10 2018 122 8457, filed on Sep. 18, 2018, and German Application No. DE 10 2018 125 804.6, filed on Oct. 17, 2018, which applications are hereby incorporated herein by reference in their entireties.

BACKGROUND

The disclosure relates to a sensor module for a machine tool, a machine element or tool element implemented with such a sensor module, and a machine tool implemented with such a machine element or tool element.

In the following, the term 'machine element or tool element' is generally understood to mean a tool body or a tool for machining with geometrically defined and undefined cutting edges and also rollers, deep-drawing tools or punching tools used in forming technology, tool holders for such tool elements as well as guiding elements and supporting elements of machine tools, such as slides, which carry or guide such tool elements and which are adjusted with the tool element.

A generic tool holder is described, for example, in the printed documents WO 2017/068158 A1 and DE 10 2006 030 834 A1 The tool holders disclosed there have a mechanical interface, for example a hollow shank taper (HST), which is inserted into a machine tool in a known manner. On the tool side, the tool holder is designed with a clamping device into which a machining tool, e.g. a milling cutter, a drill or the like, can be inserted. Steady-state instabilities can be detected and then corrected accordingly by adapting the machining parameters, such as feed rate and rotational speed, in order to detect states occurring during machining, such as a force acting on the tool holder, accelerations (vibrations) of the tool holder and the temperature, for example of the cooling lubricant or the tool. In this way, excessive application of force on the tool or vibrations occurring during machining can be minimized. The disadvantage of the existing solutions is that the sensors are specifically inserted in a separated design into different channels/pockets of the tool holder—also called tool retainer—depending on the sensor type and tool holder. For example, WO 2017/068158 A1 requires a hollow shank taper with a special design, in which corresponding hollow spaces/channels have to be provided for holding the sensor system. Such a design requires considerable expenditures in terms of equipment and manufacturing technology to produce the tool holder. Furthermore, the tool holder has to be adapted, if necessary. A further disadvantage is the application-specific design of the measuring technology and sensor system—and thus the measurement of physical quantities, which always requires a very specific solution for the respective application in the tool holder. A further common characteristic or disadvantageous design is that all solutions are based on a detected steady state of physical quantities.

SUMMARY

In view of this, the disclosure is based on the object of further developing the sensor system and/or the tool elements and machine elements of a machine tool in such a way that system states can be detected with little expenditures in terms of equipment and control engineering.

This object is solved by a sensor module with the features of the independent claim as well as by tool elements or machine elements according to a dependent claim, which are designed with such a sensor module, and by a machine tool according to another dependent claim.

Advantageous further developments of the disclosure are the subject matter of further dependent claims.

Accordingly, the disclosure creates a non-stationary and in particular modular measurement technology solution which is integrated in particular in tool elements (e.g. grinding wheel bodies, cone receptacles of cutting tools, punching tools) or devices or in a machine tool provided with a tool holder, so that reliable detection of operating or system states is possible in real time and thus already on the basis of transient transitions of system states with low expenditures in terms of equipment. The modular design also allows the solution of multi-criteria problems by the design of a built-in module. Due to the inherent flexibility in the design of modules according to this disclosure, conveniently for the application a vibration sensor in a rotating machine part can be positioned in the rotation axis and the coolant flow can be constructively diverted around this position. The resulting complex geometric shapes of the sensor modules are manufactured using additive manufacturing technologies and are inserted into the respective overall system, device, tool body or tool holder, or the standardized sensor module.

As mentioned above, the sensor modules can be used in principle for movable machine parts/elements such as slides or devices, but also in the tool bodies of tools for machining with geometrically defined and undefined cutting edges. Furthermore, the use of the sensor modules also includes tools of deformation technology, such as dies, punching tools or rollers, into which such sensor modules can be inserted to detect system states.

The sensor module according to the disclosure has a sensor system, e.g. consisting of modular sensors for the detection of system states occurring during machining, whose measurement signals are transmitted to an evaluation unit via a data transmission device. According to the disclosure, the sensor system is thus integrated as a structural unit in a, preferably cartridge-shaped, sensor module, also referred to as a 'cartridge', which is inserted into a correspondingly designed recess of a tool holder or of another tool element or machine element. According to the disclosure, this sensor module can be used on a feed slide, a device, a forming tool or a grinding wheel.

According to the disclosure, it is thus provided that the sensor system, i.e. at least the sensors required for the detection of the operating states, is formed in a module or at least as a structural unit and that it is inserted centrally into a corresponding recess of a tool element or machine element according to the disclosure—preferably in an exchangeable manner.

This design allows the sensor system to be pre-assembled with the sensor module, to be tested and then to be inserted into the tool holder or into the above-mentioned subsystems of a metal-cutting machine, so that the expenditures in terms of equipment and production technology are significantly reduced compared to the solutions described at the beginning. Furthermore, the concept according to the disclosure makes it possible to equip the tool elements or machine elements with different sensor modules depending on the manufacturing task, so that signal detection and the associated process control are guaranteed to be optimized with regard to the tool used and the manufacturing parameters used. This applies in particular to the choice of sensor systems with regard to the measurement of different physical quantities or the resolution and sensitivity of these sensors.

As mentioned above, in one example, a mechanical interface of a tool holder is designed with a clamping cone, for example an HST, to which a sensor shaft is attached pointing towards the clamping device on the tool side, in which the recess for the sensor module is formed. Neither the interfaces on the machine side nor on the workpiece side has to be constructively changed by this recess, if a sensor module is used or exchanged in the sense of the intended flexibility. Such recesses (also called pockets, holders, chambers or the like) can of course also be provided at the above-mentioned further tool elements and machine elements to hold sensor modules. In principle, it is also possible to provide several such recesses, which can be equipped with one or more sensor modules as required.

The sensor module to be used, in addition to the sensor system, which is provided, for example, for measuring force introduction, the temperature and acceleration (vibrations), can also hold the sensor electronics required for signal processing and/or a transmission device, for example a radio module and/or a power supply, such as an accumulator.

In an alternative solution, the power supply and/or the signal transmission device and/or the sensor electronics are inserted into circumferential pockets/holders, while the remaining components, such as the sensor system, are integrated into the sensor module according to the disclosure.

The positioning of these components in the pockets/holders is optimized if they are designed with an undercut, e.g, in the form of a T-slot or dovetail, by which the respective component (power supply, sensor electronics, signal transmission device, another sensor) is fixed in position, preferably in the radial direction. Such an undercut can be formed, for example, by means of a T-slot milling cutter.

In the case of a tool element, this pocket configured with an undercut can extend into the area of a gripper groove flange, at which a gripper groove is formed.

The production of the undercut is particularly easy if such a flange is placed as a separate component on a base body of the machine element or tool element after the pocket has been formed and covers the pocket in sections.

To simplify the assembly of the sensor module, a base body of the tool holder can be divided into two or more base-body parts, which are connected to the base body after inserting or attaching the sensor module or associated components.

In an example, the division takes place in the area of a gripper groove.

The flange can be attached to the base body or the base-body part can be connected by shrinking, soldering, welding or in any other way.

In an example, the sensor module is arranged coaxially to the axis of the tool element or machine element, for example the tool holder or a tool spindle, so that the imbalance is minimized and the insertion of the sensor module is also simplified. This arrangement is in particular advantageous, especially since acceleration signals, for example, are not highly superimposed by centrifugal forces.

In most cases, a tool holder is designed with a cooling lubricant supply (CLS). According to the disclosure, this modular solution allows at least part of the CLS flow path to extend through the sensor module. Here, a symmetrical design is possible in the sense of the above-mentioned imbalance occurrence.

For example, the sensor system can be at least partially oriented axially with respect to the axis of the tool holder, so that a channel for guiding the CLS is designed to be off-centered circumferentially around the sensor system. The channel can be designed—for the symmetrical arrangement it would be two opposite channels for example in an arc or with a double S-shape.

According to the disclosure, the recess for the sensor module can be oriented in the machine element or tool element in the axial direction or in the radial direction. Accordingly, the sensor module is then inserted into the recess in the axial or radial direction.

The positioning of the sensor module with respect to the recess is simplified if the sensor module is indexed accordingly.

The sensor module can be mounted in the recess in a force-fit or form-fit manner. For example, the sensor module can be inserted by press fit.

In accordance with an advantageous further development of the disclosure, the machine element or tool element, for example the tool holder or the tool body or the tool, is provided to be manufactured using a generative manufacturing process, at least in sections in the area which holds the sensor module.

In such a generative method, the component to be manufactured is built up layer by layer from shapeless or shape-neutral material—for example sintered material—by making use of physical and/or chemical effects. In an SLM (Selective Laser Melting) process, for example, metal powder is applied layer by layer and the layer is melted by means of a laser and fused with the layers below it, so that complex geometries with internal or external intersections can be formed.

In a further development according to the disclosure, the machine element or tool element is manufactured by a kind of hybrid machining, wherein at least one partial area is manufactured conventionally, for example by cutting machining, and then an inner or outer structure holding the sensor module at least partially is formed on this conventionally manufactured partial area according to a generative method, for example by means of 3D printing technology or the SLM method mentioned above.

The machine tool according to the disclosure is equipped with the described sensor module or a tool element or machine element according to the disclosure. Furthermore, the machine tool has a data acquisition and evaluation unit by means of which the measuring signals of the sensor system can be processed in real time and are transmitted to a machine tool control for the regulation of process parameters via the control signals—preferably via a real-time capable connection.

The Applicant reserves the right to base an independent claim on the arrangement of the sensor system in a recess extending in the radial direction.

BRIEF DESCRIPTION OF THE DRAWINGS

Examples of the disclosure are explained in more detail in the following by means of schematic drawings. These show.

DESCRIPTION

In the following, a tool holder 1 is described as an example, which is provided for use in a machine tool. In principle, however, such tool holders can also be provided on any machine tools used in cutting and forming technology in order to record process parameters such as forces, accelerations, temperatures, etc. Apart from cutting, a further example is the detection of the shear impact during punching, wherein the sensor module in this application can be applied to the cutting tool.

As described above, other tool elements or machine elements can also be implemented with one or more of the sensor modules described below.

Figure 1:
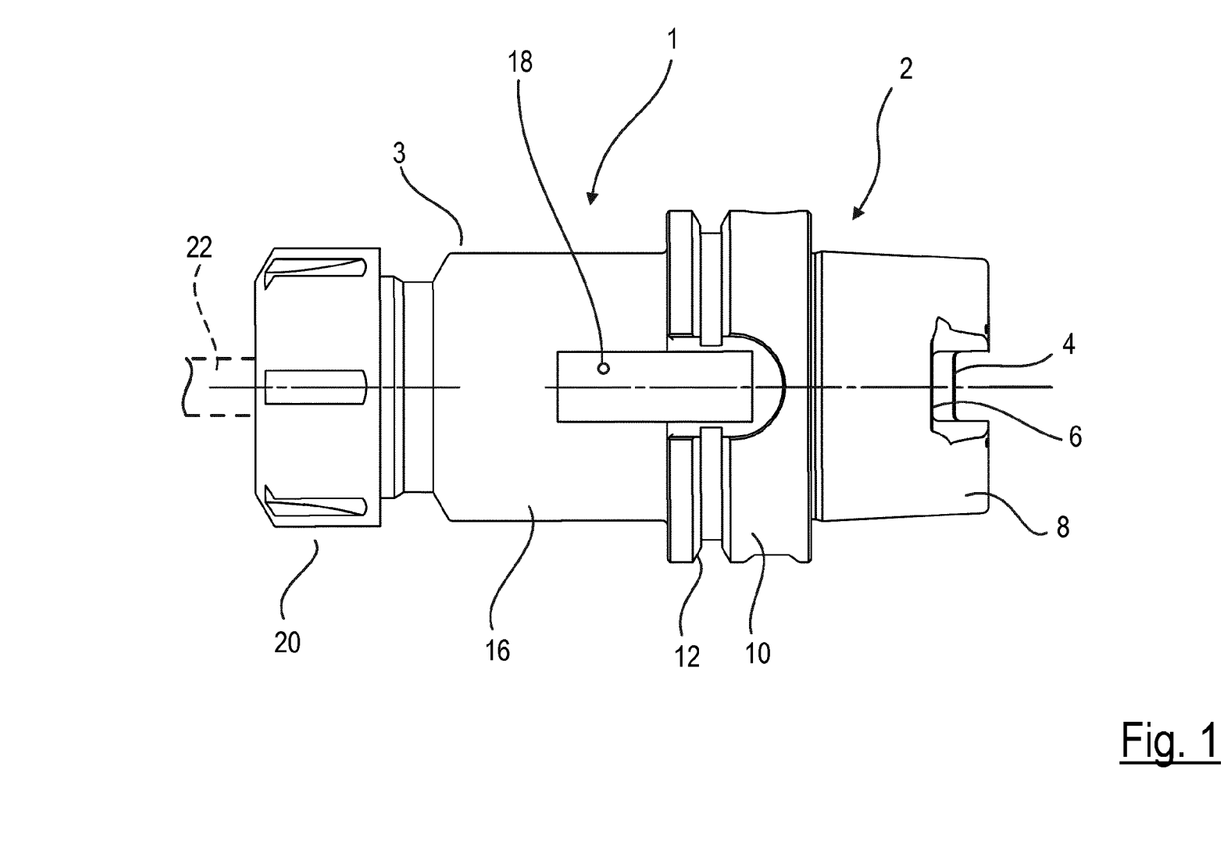
FIG. 1 shows a tool holder according to the disclosure in a side view.

FIG. 1 shows a first example of such a tool holder 1, which has a hollow shank taper (HST) 2 on a base body 3 as a mechanical interface to the machine tool, which has two driver grooves 4, 6 in the known manner on the actual cone 8, a gripper groove 12 on a gripper groove flange 10 as well as an indexing groove (not shown) to facilitate automatic tool change. The structure of such HST/adapters is known, so that further explanations are not necessary. A sensor shaft 16 is attached to the base body 3 adjacent to the HST 2, which accommodates the sensor system explained in more detail in FIGS. 2 and 3. In the variant shown in FIG. 1, the measuring signals of this sensor system are transmitted to an evaluation unit on the machine tool side via an antenna 18 and a radio module (not shown) or another data transmission device. This antenna 18 can be located on the periphery in the area of the sensor shaft 16, and/or of the flange 10, and/or of the gripper groove 12, as shown in FIG. 1.

In the illustration in FIG. 1, to the left of the sensor shaft 16, a clamping device 20 is formed on the base body 3, over which a tool 22 (dashed line) is clamped in a manner known per se.

Figure 2:
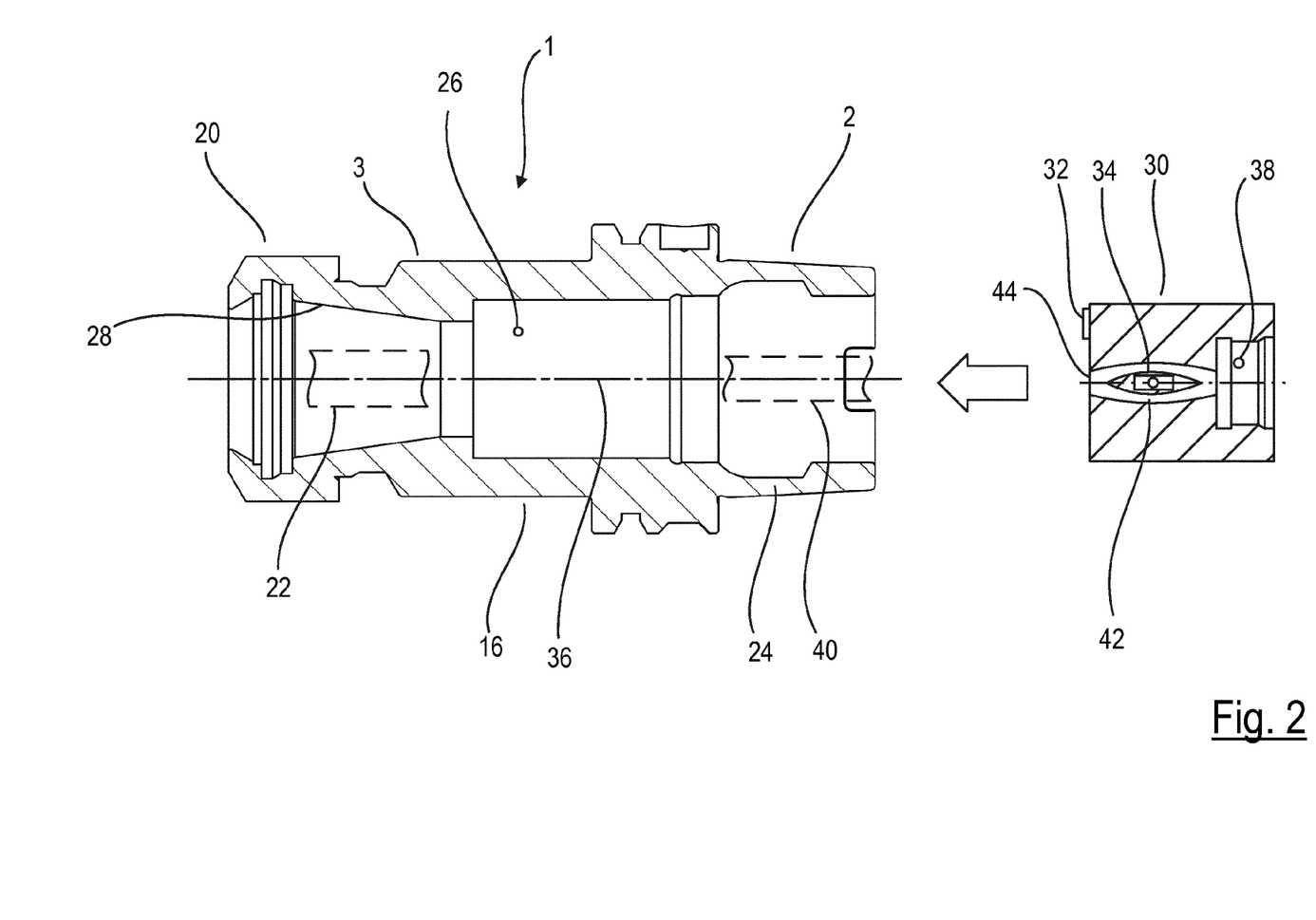
FIG. 2 shows a cut exploded view of the tool holder according to FIG. 1.

FIG. 2 shows a cut exploded view of the tool holder 1 according to FIG. 1, wherein the clamping means of the clamping device 20 and the actual coolant/lubricant supply are not shown in detail.

In the example HST 2 described above, the sensor shaft 16 and the clamping device 20 are formed in one piece. Of course, a modular design is also possible, in which the individual components are connected to each other via suitable connecting means.

In the area of the sensor shaft 16, a roughly cylindrical recess 26 adjoins a cavity of the conical hollow shaft 24 of the HST 2, which in turn transitions into a clamping cone 28 on the clamping device side. A cartridge, the sensor module 30, shown on the right in FIG. 2, is inserted into the approximately cylindrical recess 26 and locked in place by force-fit or form-fit locking. The sensor module 30 can, for example, be held in the recess 26 by a press fit. For positioning, the sensor module 30 can be provided with an index projection 32, which fits exactly into a corresponding index clearance of the recess 26. Of course, the projection can also be provided on the recess side.

According to the disclosure, a sensor system 34 is included in the sensor module 30. In the example shown, this sensor system 34 or at least one of the sensors is arranged approximately coaxially to the axis 36 of the tool holder 1. The approximately cylindrical sensor module 30 is also arranged coaxially to the axis 36. As shown in FIG. 2, the sensor module 30 is inserted through the cavity of the HST 2. In the transition area to the cavity, the sensor module 30 is equipped with a connection 38, which can be brought into fluid connection with a tube 40 containing a cooling lubricant (CLS). In the example shown in FIG. 2, this cooling lubricant is conveyed around the sensor system 34 via an arcuately branching channel 42 inside the sensor module 30 and then flows into an exit terminal 44 in the area of the clamping device, so that the clamped tool 22 is supplied with cooling lubricant. As described above, a favorable design is symmetrical, in which the sensor system is surrounded by two channels.

In the example shown in FIG. 2, the sensor module 30 contains besides the actual sensor system 34, i.e., for example, an acceleration sensor, a temperature sensor and/or a strain gauge or another sensor for detecting the application of force, the associated sensor electronics, which is in signal connection with the antenna 18 visible in FIG. 1. A power supply, for example an accumulator package, can also be integrated in the sensor module 30. This means that, apart from the antenna 18, all components required for signal detection and signal transmission to the antenna 18 are integrated in the sensor module 30, so that, for example, by replacing the sensor module 30, a sensor system optimized for the respective machining process can be used without changing the tool holder 1.

Figure 3A:
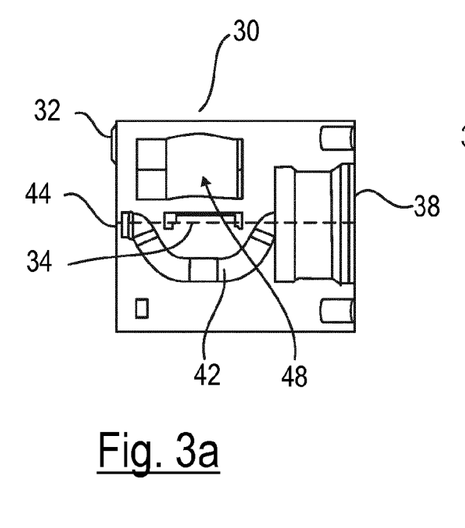
FIGS. 3a, 3b show variants of a sensor module shown in FIG. 2 for holding a sensor system.

FIG. 3a shows a variant of the sensor module 30 according to FIG. 2. Similar to the example described above, the actual sensor system 34 is designed with an acceleration sensor, for example, located in the area of the axis 36 (FIG. 2). In this example, the channel 42 for conducting the CLS is not branched, but rather U shaped or double-S shaped, so that the sensor system 34 is bypassed by the channel 42. As with the example described above, this channel provides a fluid connection between the terminal 38 and an exit terminal 44. In the example shown here, the sensor module 30 also has an integrated energy supply, which is formed by an accumulator package 48, for example. The actual sensor electronics, which is also integrated in the sensor module 30, is not shown in FIG. 3a.

Figure 3B:
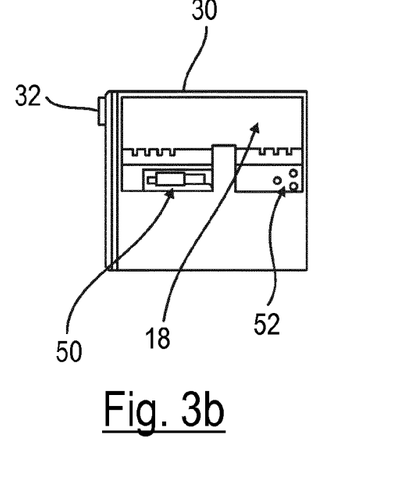

This sensor electronics 50 is visible in the example according to FIG. 3b. Accordingly, this sensor electronics 50 is formed by a circuit board with the corresponding circuit. This sensor electronics 50 includes all components for data preprocessing, data transmission, and control of the energy supply. In FIG. 3b, terminal pins 52 for the antenna 18 are shown as an example, via which the measurement signals detected by the sensor system are transmitted to an evaluation unit described below.

Otherwise, the example corresponds to the one in FIG. 3a, so that further explanations are not necessary.

Figure 4:
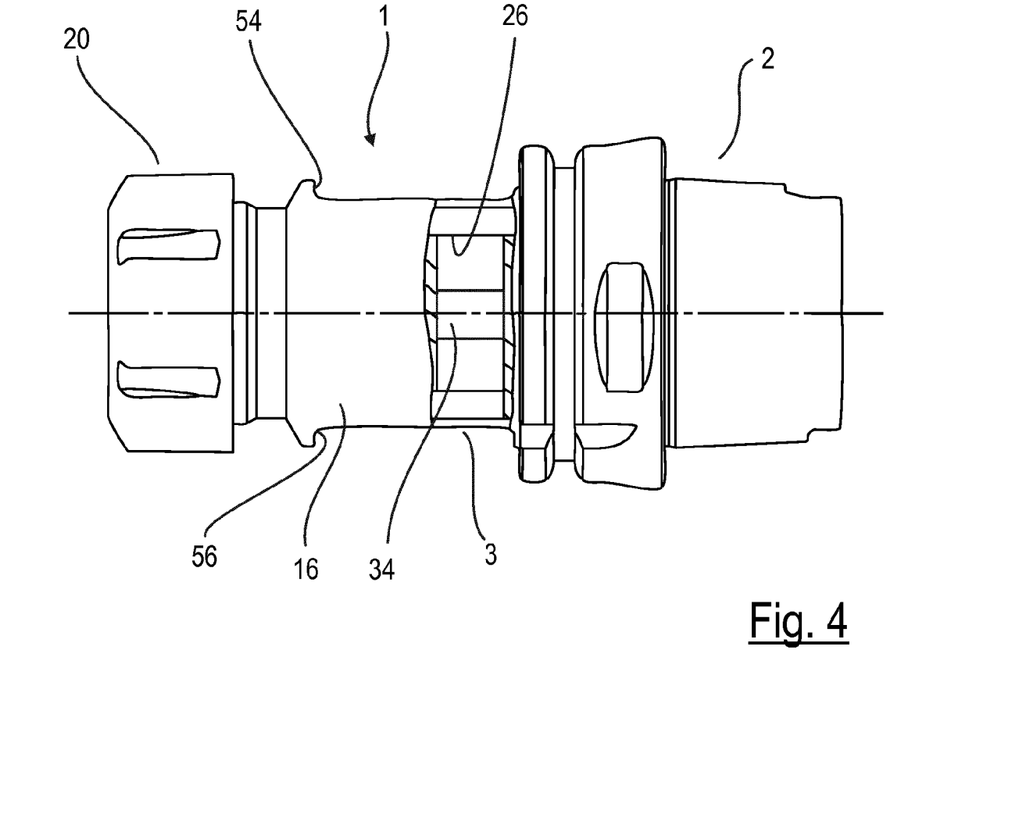
FIG. 4 shows a further example of a machine tool according to the disclosure.

FIG. 4 shows a variant of a tool holder 1 in which the recess 26 in the sensor shaft 16 is not oriented in the axial direction but in the radial direction. This means that in this example, the sensor module 30 or the sensor system is inserted into the sensor shaft 16 in the radial direction. In this example, the integration of the structural components into the sensor module 30 is minimized in that essentially only the sensor system is inserted into the radial recess 26. The other structural components, such as the sensor electronics described above, the antenna/transmission device and/or the power supply (battery pack 48) are arranged on the circumference of the sensor shaft 16. For this purpose, pockets 54, 56 can be provided on the circumference, into which the respective components are inserted. In order to avoid imbalances, it can also be advantageous to arrange the power supply, for example the accumulator package, in an axial position. The power supply can be provided by the accumulator package and/or by a magnetic field (induction) or something similar.

The structure of the HST 2 and the clamping device 20 corresponds to the example described above, so that reference is made to the above explanations.

Figure 5:
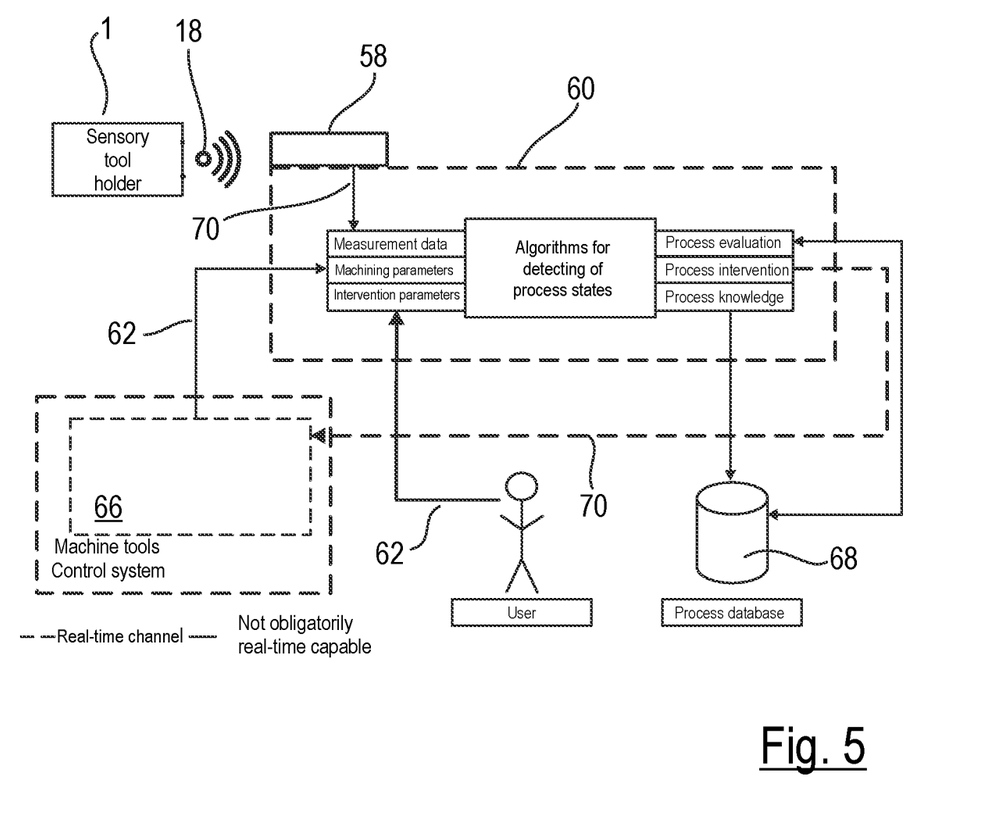
FIG. 5 shows a schematic illustration of a control/regulation concept of a machine tool according to the disclosure implemented with a tool holder.

FIG. 5 shows a block diagram of the control/regulation assembly of a machine tool or another processing machine designed with the tool holder 1 according to the disclosure. As mentioned above, the signal transmission of the preprocessed measuring signals acquired by the sensory tool holder 1 is preferably affected by radio via a transmitter and the antenna 18. On the machine-tool side, a receiver (transceiver) 58 is provided for receiving the data transmitted by radio. The control assembly enables an ad-hoc reaction to instability states that have not yet stabilized. This is implemented by a real-time adaptation of machining parameters, such as feed rate, rotational speed, etc., whereby this adaptation is implemented depending on the process states, such as vibration or the application of force on the tool. These process states are detected by the sensory tool holder 1 according to the disclosure and transferred to the control assembly. This essentially consists of a data acquisition and evaluation unit 60, via which—as mentioned above—the process stability is assessed and, if necessary, processing parameters are changed, if this process stability does not correspond to the specification. The receiver 58 (transceiver) is connected to this data acquisition and evaluation unit 60 via a real-time channel 70. The evaluation unit 60 is configured via a configuration connection 62. The adaptation of the processing parameters is performed based on the acquired process states, which are evaluated by the evaluation unit. However, other machine-internal measurement data as well as data from an additional external sensor system or data from a process database 68 can be received by the evaluation unit 60.

The evaluation unit 60 receives measurement data from the moving sensor module, in this case the rotating sensory tool holder 1, stores them in a buffer memory and promptly processes various algorithms for the acquisition of process states. It also forms the interface to the aforementioned process database. The algorithms used are designed to determine the conditions under which an intervention in the NC control of the machine tool takes place. A part of the algorithms determines process states from the measurement data of the tool holder 1. Another part of the algorithms links these process states with processing parameters, such as material parameters, user inputs and/or process database values, in order to decide whether an intervention is necessary. Another part of the algorithms adapts the processing parameters on the basis of this data. The process states preferably refer to the data currently measured in real time and not to data collected from other production runs. In addition, the soft sensor approach can be used to draw conclusions about secondary process results such as the surface quality of the workpiece from the measured data of the tool holder 1.

The system is configured via a non-obligatory real-time connection, for example via an OPC UA application and/or via the machine tool control, for example using M commands. The algorithms can be selected according to the machining step (e.g. roughing, finishing, fine finishing) and different component materials. In this way, intervention parameters can also be changed. In addition, when using several evaluation units, the linking of the individual sensors to the corresponding algorithms and the resulting process parameters can be determined.

The evaluation unit 60 is connected to the machine tool control 66 via a real-time channel 70. This enables an ad-hoc adjustment of machine feed and/or machine rotational speed during machining. Typical applications are the prevention and/or detection of process errors, process instabilities, tool breakage and so on. Premature tool wear can also be detected—in the latter case a signal for tool change is generated. If any process instability or the like occurs, the machining parameters are changed via the machine tool control 66 as a reaction. In addition, machine data can also be transferred to the evaluation unit 60 for analysis.

The process database 68 is used for the joint documentation of process signals of the tool holder 1 with NC records, machine-internal measurement data as well as measurement data of additional external sensor systems and thus opens up the possibility of collecting and utilizing a multitude of data essential for machine control. These data sets make it possible to calculate and analyze complex correlations between process parameters and manufacturing results, so that it is possible to optimize NC programs with regard to process stability on the basis of such a process database 68.

Figure 6:
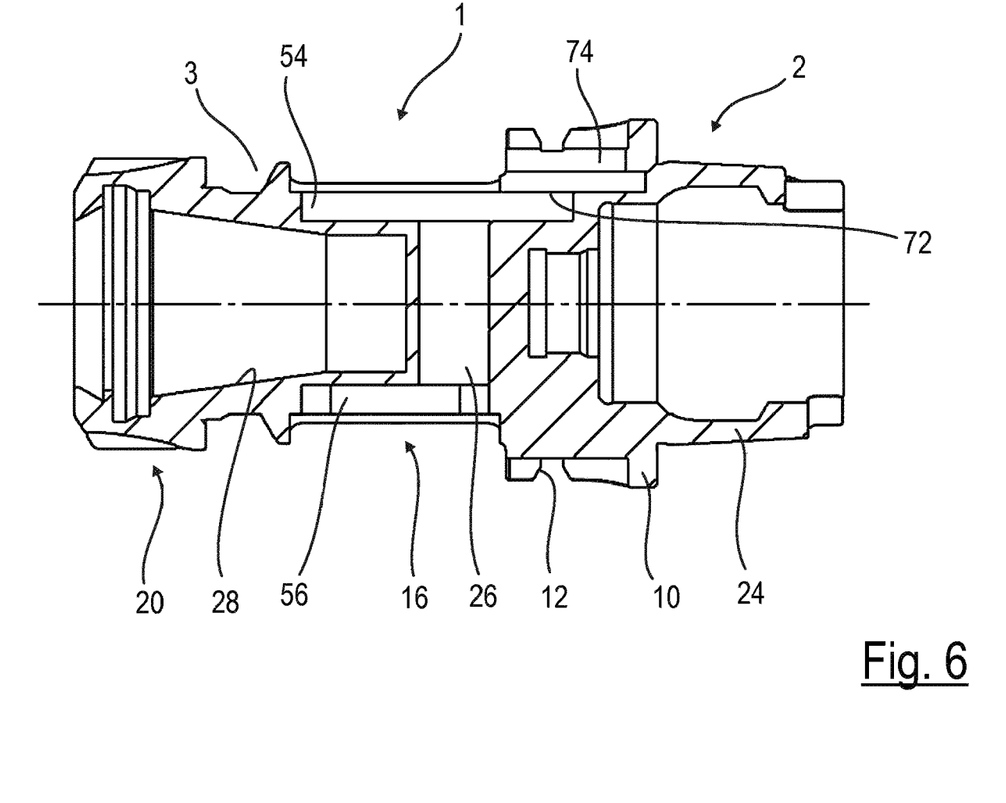
FIG. 6 shows a variant of the example according to FIG. 4, wherein one pocket is designed with an undercut.

The basic structure of the tool holder 1 shown in FIG. 6 corresponds largely to the examples shown in FIGS. 2 and 4, so that only essential components are explained in order to avoid repetition and, furthermore, reference can be made to the above description.

Accordingly, the tool holder 1 has a clamping device 20 as shown in FIG. 6, which is designed with an inner clamping cone 28. The clamping device 20 is joined on the right by a sensor shaft 16, which—similar to the example in FIG. 4—has a recess 26, for example oriented in the radial direction, for the sensor module 30 described above. In the example shown in FIG. 6, the recess 26 for holding the sensor module 30 opens into two pockets 54, 56 located radially outside, into which a power supply or a transmission device or a sensor electronics or an antenna or the like can be inserted.

The sensor shaft 16 is followed by a known HST 2, whereby the gripper groove flange 10 with the gripper groove 12 is provided in the transition area.

In contrast to the example explained in FIG. 4, the pocket 54 does not end at the gripper groove flange 10, but extends as shown in FIG. 6 into the area enclosed by the outer circumference of the gripper groove flange 10. Especially in this area, an undercut 72 is formed which helps to fix the position of the component to be inserted into this pocket 54. The undercut 72 can be formed using a T-slot cutter, for example. The pocket 54, which extends far under the gripper groove 12, makes it possible to equip a variety of common designs with the sensor electronics or other components. For the production of the undercut 72, for example, the gripper groove 12 can be milled out in the area marked with the reference sign 74, so that the groove can then be formed using the T-slot cutter. This undercut 72 creates a very simple geometric integration solution for positioning/fixing the external components of the sensor module.

Figures 7A, 7B:
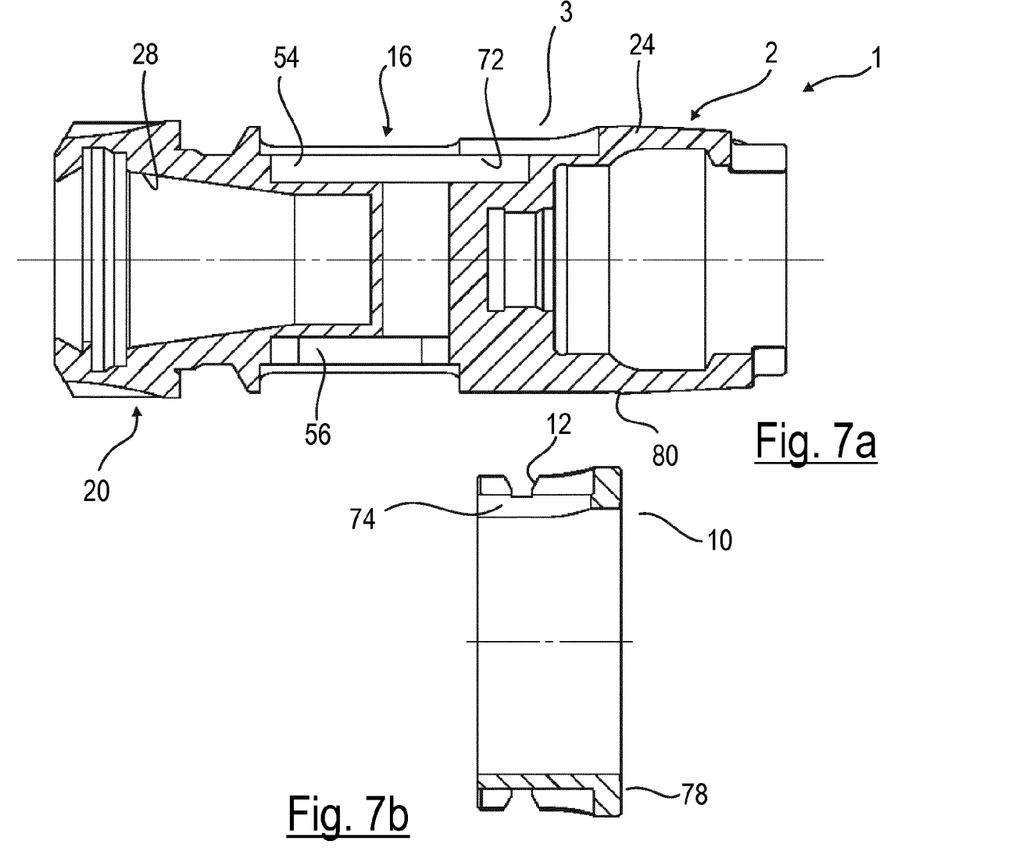
FIGS. 7a, 7b show a further example in which a gripper groove flange is designed as a separate component that is placed on a base body of the machine element or tool element.

FIGS. 7a, 7b show a configuration example in which the formation of the undercut 72 for the pocket 54 is simplified.

In the example according to FIGS. 7a, 7b, the clamping device 20 with the clamping cone 28, the sensor shaft 16 and the HST 2 are formed by the base body 3. The gripper groove flange 10 with the gripper groove 12 is designed as a separate component, which is then placed on this base body 3 after milling the pocket 54 with the undercut 72, e.g. shrunk onto it, wherein the axial position is determined by the relative positioning of a front surface 78 to an abutment shoulder 80. When mounted, the gripper groove flange 10 covers at least sections of the undercut 72 of the pocket 54. This divided design with a base body 3 and a gripper groove flange 10 offers comprehensive options for pocket design and thus for electronic integration. With the example according to FIG. 7b, a milled-out region 74 can also be provided in the area of the gripper groove 12, which ends in the undercut 72.

Figures 8A, 8B:
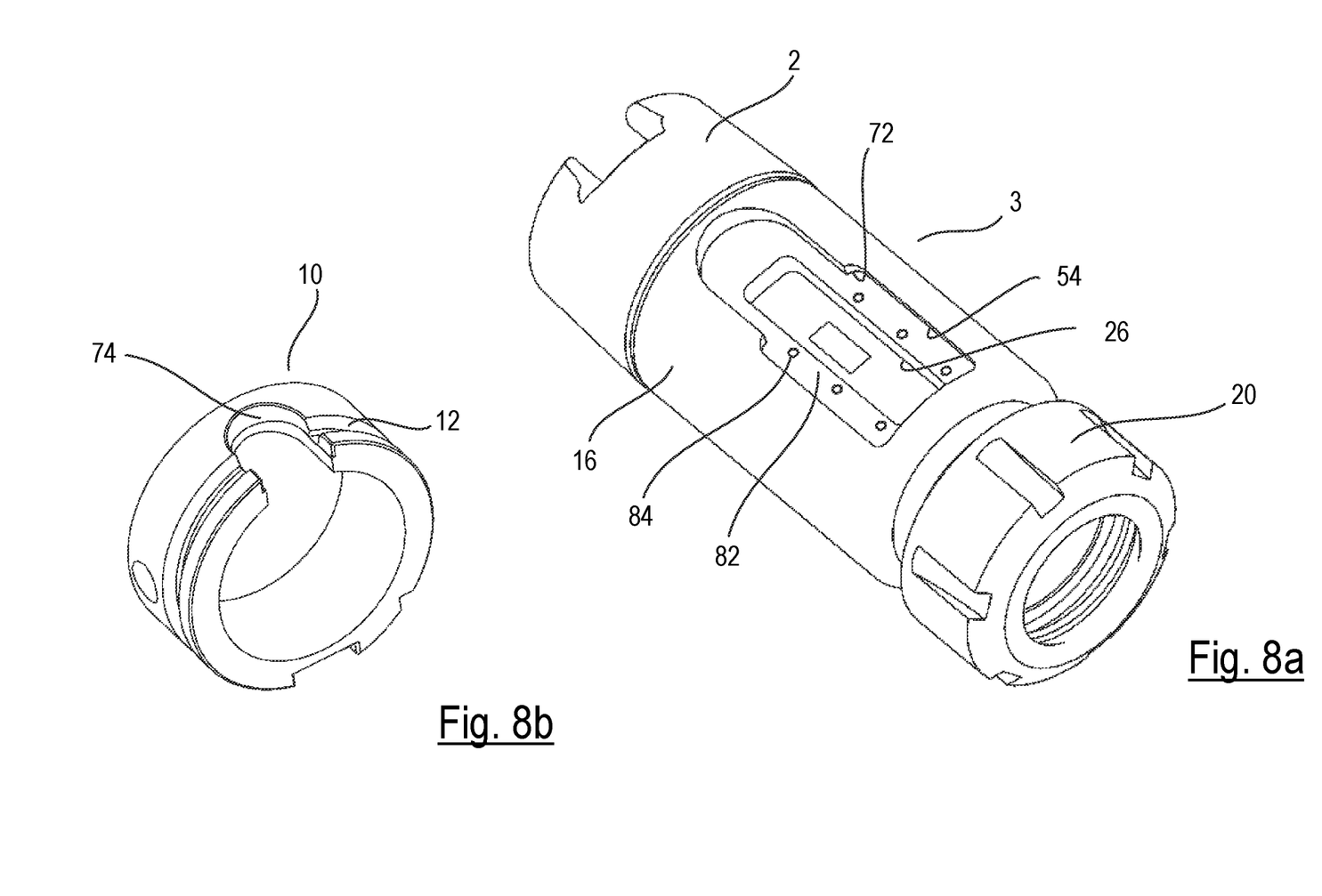
FIGS. 8a, 8b show a three-dimensional illustration of the gripper groove flange and the base body according to FIG. 7.
Figures 9A, 9B:
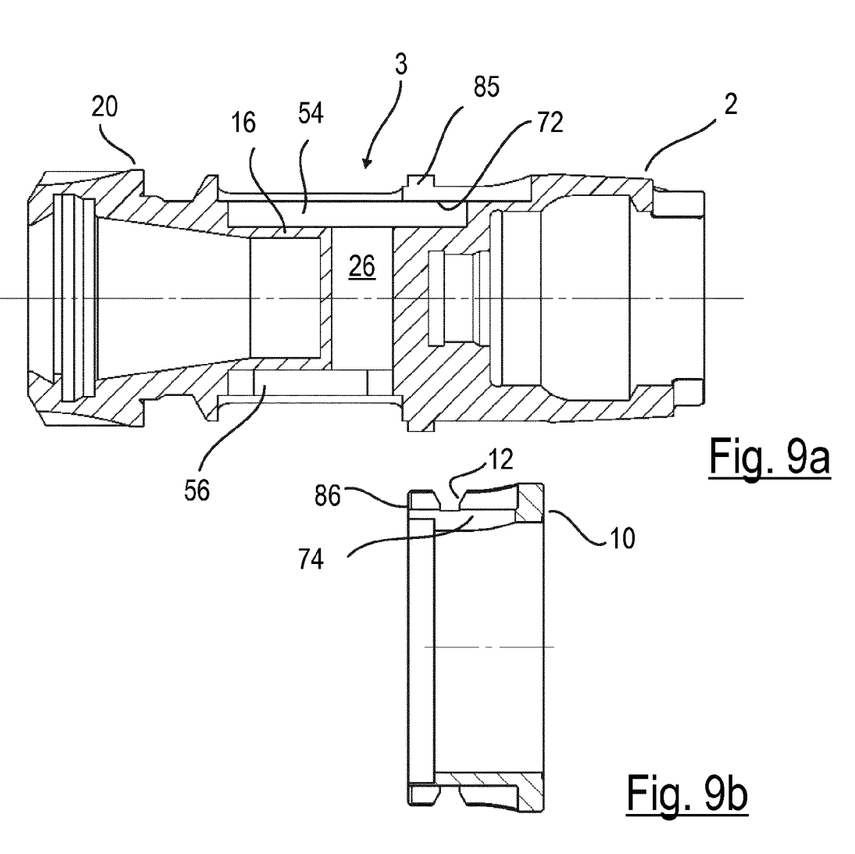
FIGS. 9a, 9b show a variant of the example according to FIGS. 7 and 8.
Figure 10A:
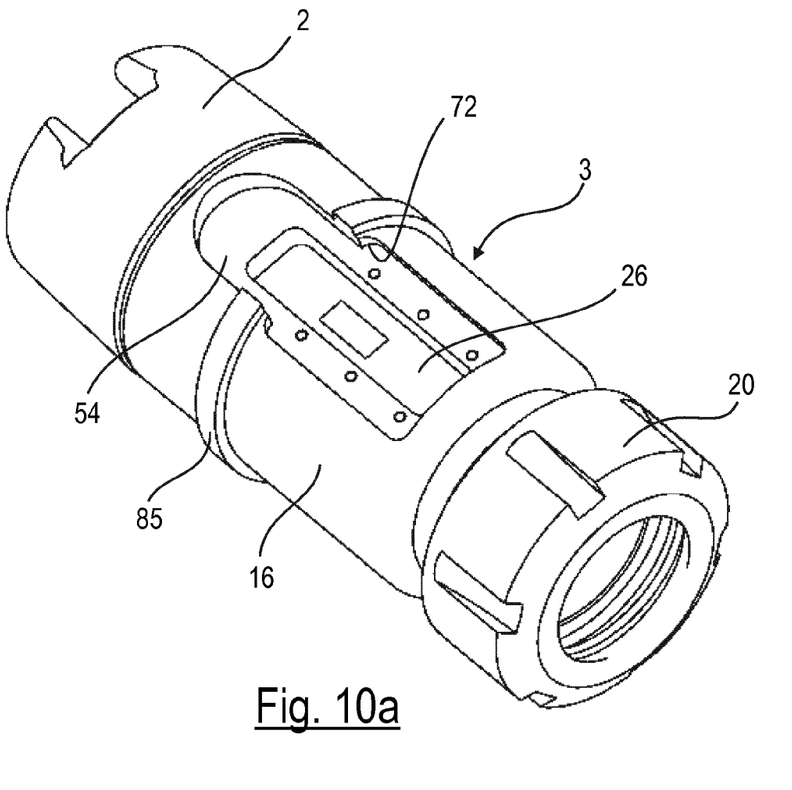
FIGS. 10a, 10b show a three-dimensional illustration of the example according to FIG. 9.
Figure 10B:
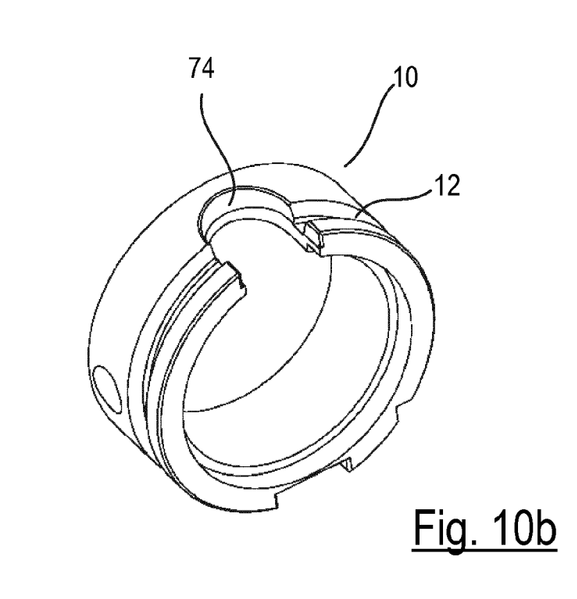

FIGS. 8a, 8b show three-dimensional illustrations of the base body 76 and the flange 10. This illustration clearly shows the milled-out area 74, which practically interrupts the gripper groove 12 and extends into the pocket 54 with the T-slot-shaped undercut 72. As shown in the illustration in FIG. 8a, the pocket 54 extends into the area of the radial recess 26, into which the actual sensor module 30 is inserted. The width of the pocket 54 is slightly larger than that of the recess 26, so that a bearing surface 82 is formed on which the component, for example the sensor electronics, can be placed. The bearing surface 82 is provided with fixation recesses 84, e.g. threaded holes or the like, to fix the sensor electronics or to pass through signal lines. The pocket is widened at the end of the T-slot-shaped undercut 72 formed in sections. The fixation recesses 84 are formed in this area, which also simplifies the insertion of the electronic components into the undercut 72.

The end face of the pocket 54 facing the HST 2 in FIG. 8a is rounded. The milled-out area 74 has a correspondingly rounded inner face.

FIGS. 9a, 9b and 10a, 10b show a variant of the example described above. The base body 3 has an approximately circular stop collar 85, which is designed as a contact surface for the front surface 86 of flange 10 (left-hand side in FIG. 9b) so that it is reliably fixed in position in the axial direction.

FIGS. 10a, 10b again show three-dimensional illustrations of the base body 3 and the flange 10. As can be seen from this illustration, the stop collar 85 is interrupted by the mouth area of the pocket 54 and, incidentally, surrounds the base body 3, more precisely the sensor shaft 16.

Moreover, the example according to FIGS. 9a, 9b and 10a, 10b corresponds to the example described above, so that further explanations are unnecessary.

In the examples according to FIGS. 6 to 10, the holder 26 for the sensor module 30 ends—as explained—in the pocket(s) 54, 56. In principle, the pocket 56 or other pockets can of course also be designed with an undercut for fixing the position of an electronic component or the like. Instead of the described T-slot undercut, other undercut shapes, for example a dovetail-shaped undercut or the like, can of course also be designed.

In the examples shown in FIGS. 1 to 6, the base body 3 of the tool holder is monolithic and designed as a single part. FIGS. 7 to 10 are used to illustrate examples in which the gripper groove flange 10 with the gripper groove 12 is designed as a separate component and is then connected to the actual base body 3.

Figure 11:
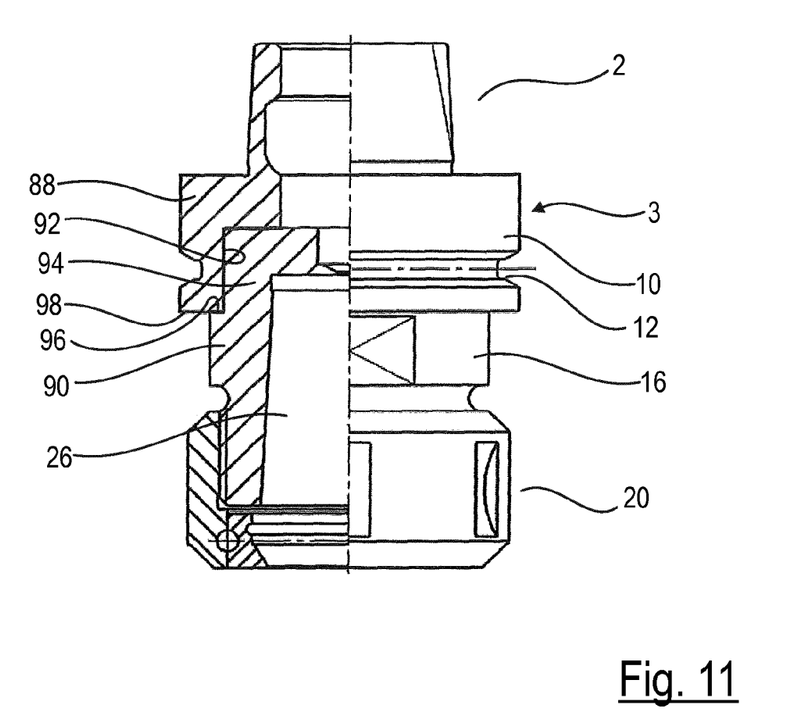
FIG. 11 shows a variant of a tool holder with a divided base body.

FIG. 11 shows a variant in which the base body 3 is divided into two base body parts 88, 90, which complement each other to form the base body 3. The gripper groove flange 10 is formed on the base-body part 88 located at the top in FIG. 11, in the area of which an inner circumferential surface of the base-body part 88 is extended to form a holder 92, into which an axial projection 94 of the base-body part 88 located at the bottom in FIG. 11 is immersed. This axial projection 94 has a radial shoulder 96, on which an annular front surface 98 of the gripper groove flange 10 or of the base-body part 88 rests, so that both base-body parts 88, 90 are positioned in relation to each other in both the radial and axial directions.

Before mounting the sensor module 30 with the actual sensor system 34. The base body 3 is divided so that these components can be easily inserted into the base-body part 90 which is axially open. After mounting, the upper base-body part 88 is attached and connected to the lower base-body part 90.

This joining can be done by shrinking, for example, whereby the lower base-body part 90 is cooled with liquid nitrogen, for example, and/or joined by a material-locking process, for example by welding using a laser or electron beam.

Instead of the stepped separation plane between the two base-body parts 88, 90, as described above, a different course can of course be used. For complex solutions, the base body 3 can also be divided into more than two parts in order to simplify the mounting of the sensor module 30 in the recess 26. In principle, it is also possible to create the channels for guiding the CLS in a simple way by dividing the base body 3, by forming a part of the channel structure on both sides of the separation plane, so that complex channel shapes can also be formed when the base body parts 88, 90 are joined as described above.

Of course, the separation of the base body 3 as described above can also be realized with the examples described at the beginning.

As explained at the beginning, the base body 3 of the machine element or tool element or any other component for holding the sensor module 30 can be formed at least in sections according to a generative process, for example by laser sintering or by 3D printing technology. In the case of the tool holder described above, the cone part, for example, with the HST and the flange 10 formed with the gripper groove 12 can be manufactured conventionally. The complex structure for holding the sensor module 30 is then built on this blank using the generative process.

In principle, it is also possible to use a generative manufacturing process to produce the entire tool holder 1 with the base body 3, the cone 8, the flange 10 and the gripper groove 12.

Disclosed are sensor modules for e.g. a tool holder, in which the sensor system is integrated as a structural unit and tool elements or machine elements designed with such sensor modules as well as a machining/machine tool with such a sensor module.

LIST OF REFERENCE SIGNS 1 tool holder
2 hollow shank taper (HST)
3 base body
4 driver groove
6 driver groove
8 cone
10 flange
12 gripper groove
16 sensor shaft
18 antenna
20 clamping device
22 tool
24 hollow shaft
26 recess
28 clamping cone
30 sensor module
32 index projection
34 sensor system
36 rotation axis
38 terminal CLS
40 coding lubricant pipe
42 channel
44 exit terminal
48 accumulator package
50 sensor electronics
52 terminal pins
54 pocket
56 pocket
58 receiver/transceiver
60 evaluation unit
62 configuration connection
66 machine tool control
68 process database
70 real-time channel
72 undercut
74 milled-out region
78 front surface
80 abutment shoulder
82 bearing surface
84 fixation recess
85 stop collar
86 left front surface
88 base-body part
90 base-body part
92 holder
94 axial projection
96 radial shoulder
98 annular front surface

What is claimed is:

1. A sensor module for a machine tool or machining unit, comprising a sensor system for detecting system states or operating states which occur during the machining of a workpiece and having a data transmission device for transmitting measurement signals of the sensor system to an evaluation unit, wherein the sensor module, which is designed as a structural unit, is cartridge-shaped, and is configured to be inserted into a recess of a tool holder, or
of a tool body of a lathing or milling tool, or
of a tool of a forming technology, such as a roller, a deep-drawing tool or a punching tool.

2. The sensor module according to claim 1, in which the sensor system, a sensor electronics, the data transmission device, and a power supply are integrated.

3. The sensor module according to claim 2, wherein the cartridge-shaped sensor module has an outer shell which encases the sensor system, the sensor electronics, the transmission device, and the power supply.

4. The sensor module according to claim 3, wherein the power supply is an accumulator.

5. The sensor module according to claim 1, in which a channel is formed for conducting cooling lubricant from a mechanical interface to a clamping device.

6. The sensor module according to claim 5, wherein the sensor system is at least partially arranged in a rotation axis and the channel is designed to be circumferential to the sensor system.

7. The sensor module according to claim 6, wherein the channel is designed as two opposite channels arranged circumferentially to the sensor system.

8. The sensor module according to claim 7, wherein the two opposite channels are arranged in an arc or an S shape.

9. The sensor module according to claim 7, wherein the two opposite channels are symmetrical.

10. The sensor module according to claim 6, wherein the channel is U shaped or double-S shaped.

11. The sensor module according to claim 5, wherein the cartridge-shaped sensor module is equipped with a connection, which is in fluid connection with a tube containing a cooling lubricant.

12. The sensor module according to claim 1, wherein the sensor module is configured to be inserted into the recess of:
the tool holder, or;
the tool body of the lathing or milling tool, or;
the tool of the forming technology, such as the roller, the deep-drawing tool or the punching tool.

13. The sensor module according to claim 1, wherein the cartridge-shaped sensor module is provided with an index projection, which fits into a corresponding index clearance of the recess.

14. The sensor module according to claim 13, wherein the index projection is positioned axially on a side of an exit terminal and is radially spaced to a center axis of the sensor module.

15. The sensor module according to claim 1, wherein the cartridge-shaped sensor module is a closed structural unit with a closed surface.

16. The sensor module according to claim 1, wherein an axial length of the cartridge-shaped sensor module is approximately same as a diameter of the cartridge-shaped sensor module.

17. The sensor module according to claim 1, wherein a cavity is formed in the cartridge-shaped sensor module, in which the sensor system is positioned.

18. The sensor module according to claim 1, wherein the sensor system is pre-assembled with the sensor module prior to being inserted into the recess.

19. The sensor module according to claim 1, wherein the sensor module is configured to be exchangeable.

20. The sensor module according to claim 1, wherein the sensor module is configured to be inserted into the recess in a form fit or force fit manner.

* * * * *